United States Patent
Plehn et al.

(10) Patent No.: US 7,768,968 B2
(45) Date of Patent: Aug. 3, 2010

(54) METHOD AND DEVICE FOR OPTIMISING CELLULAR WIRELESS COMMUNICATION NETWORKS

(75) Inventors: Jürgen Plehn, Krefeld (DE); Jann Erik Dietert, Düsseldorf (DE); Johannes Hübner, Dresden (DE); Michael Berg, Solingen (DE); Peter Schneider, Korschenbroich (DE); Dietrich Hunold, Dresden (DE); Peter Steinkönig, Hilden (DE); Jürgen Deiβner, Dresden (DE); Jens Voigt, Dresden (DE)

(73) Assignee: Vodafone Holding GmbH, Dusseldorf (DE)

( * ) Notice: Subject to any disclaimer, the term of this patent is extended or adjusted under 35 U.S.C. 154(b) by 950 days.

(21) Appl. No.: 11/124,629

(22) Filed: May 6, 2005

(65) Prior Publication Data

US 2005/0254455 A1 Nov. 17, 2005

Related U.S. Application Data

(63) Continuation of application No. PCT/EP03/12333, filed on Nov. 5, 2003.

(30) Foreign Application Priority Data

Nov. 6, 2002 (DE) ............................ 102 51 993

(51) Int. Cl.
  *H04W 4/00* (2009.01)
  *H04W 72/00* (2009.01)
  *H04B 7/00* (2006.01)
(52) U.S. Cl. .............................. 370/329; 455/453
(58) Field of Classification Search ................ 370/329
  See application file for complete search history.

(56) References Cited

U.S. PATENT DOCUMENTS

| | | | | |
|---|---|---|---|---|
| 5,561,841 A | * | 10/1996 | Markus | 455/446 |
| 6,044,249 A | * | 3/2000 | Chandra et al. | 455/62 |
| 6,128,500 A | | 10/2000 | Raghaven et al. | 455/453 |
| 6,199,010 B1 | * | 3/2001 | Richton | 701/206 |
| 6,850,764 B1 | * | 2/2005 | Patel | 455/450 |

(Continued)

FOREIGN PATENT DOCUMENTS

EP      92850055.2      3/1992

(Continued)

OTHER PUBLICATIONS

Jung-Shyr Wu, Jen-Kung Chung, Chang-Chung Wen, Hot-spot traffic relief with a tilted antenna in CDMA cellular networks, IEEE Transactions on Vehicular Technology, vol. 47, No. 1, pp. 1-9, Feb. 1998.*

*Primary Examiner*—Daniel J Ryman
*Assistant Examiner*—Christopher Crutchfield
(74) *Attorney, Agent, or Firm*—Lawrence G. Fridman

(57) ABSTRACT

A method of optimising real cellular, wireless communication networks comprising the steps of providing location-referenced values of subscriber traffic for area elements; transmitting a reference signal of constant transmission power; providing a cell-referenced value of the power received from the reference signal; providing a model of the communication network having an original model network configuration, and iteratively optimising the model network configuration by accumulating and weighting the subscriber traffic values of the area elements and by locally adjusting the model network configuration, to provide an optimised model network configuration.

13 Claims, 3 Drawing Sheets

U.S. PATENT DOCUMENTS

| | | | |
|---|---|---|---|
| 6,940,838 B1 * | 9/2005 | Stead | 370/335 |
| 7,035,632 B2 * | 4/2006 | Gutowski | 455/423 |
| 7,054,635 B1 * | 5/2006 | Ritzen et al. | 455/444 |
| 7,076,250 B2 * | 7/2006 | Gustafsson | 455/436 |
| 7,142,523 B1 * | 11/2006 | Chekuri et al. | 370/328 |
| 7,313,393 B2 * | 12/2007 | Chitrapu | 455/425 |
| 2003/0212798 A1 * | 11/2003 | Furuskar et al. | 709/227 |

FOREIGN PATENT DOCUMENTS

| | | |
|---|---|---|
| WO | WO 00/11884 | 3/2000 |
| WO | WO 01/37446 | 5/2001 |
| WO | WO 02/35872 | 5/2002 |
| WO | WO 02/082843 | 10/2002 |

* cited by examiner

METHOD AND DEVICE FOR OPTIMISING CELLULAR WIRELESS COMMUNICATION NETWORKS

This application is a continuation of International Application PCT/EP2003/012333 filed Nov. 5, 2003, which claims priority of German Patent Application S.N. 102 51 993.5 filed Nov. 6, 2002.

FIELD OF THE INVENTION

The invention relates in general to cellular wireless technology, and more specifically it relates to method and device for optimising the throughput of messages in cellular wireless communication networks.

BACKGROUND OF THE INVENTION

Introducing cellular, wireless communication networks presented, from the beginning, the problem of finding, during construction and later extension and operation of the networks, configurations which permit optimal utilisation of the available resources of hardware and frequency band width. The goal is, above all, maximisation of the throughput of messages with acceptable network quality and adequate network availability and network coverage, respectively. There, the concrete target quantity may be different. Thus e.g. the jam rate may be minimised, as, for example, explained in U.S. Pat. No. 5,826,218. WO 98/53621, again, is based on measured pilot reception power values. In order to achieve the goals of network optimisation, different parameters of the network configuration are adjusted, usually locally limited. This may be, for example, the adjustment of the aerial diagram or the pilot power, respectively, as in U.S. Pat. No. 5,276,907, or the receiver sensitivity, as in WO 01/37446 A1.

In cellular phone networks, which, as a rule, only transmit information from stationary transmitting stations to subscribers, who may be mobile, comparable to conventional broadcasting, methods are used which optimise the network configuration mainly with respect to the network coverage, based on the radio wave propagation characteristics in the neighbourhood. In doing so, substantially radio wave propagation simulation and/or measurements of the average reception power as well as of the service quality at certain locations in the network are employed. The basic approach for such methods has been described in Norbert Geng, Werner Wiesbeck, "Planungsmethoden für die Mobilkommunikation", Springer-Verlag Berlin, 1998, ISBN 3-540-64778-3.

In communication networks such as the GSM-standard which use many frequency bands, the frequency bands are allotted to the individual cells of the network. In doing this, appropriate distribution of the frequency bands on the cells of the network play a decisive roll in frequency minimising and thereby, throughput maximising. Such methods of frequency planning of the network are often summarised under the term "automatic frequency planning" (AFP).

With increasing importance of the various mobile data services and the development towards mobile communication networks of third generation, for example in accordance with the UMTS-standard, which is being developed within the framework of the international "3$^{rd}$ Generation Partnership Project" (3GPP), a network planning that meets the demands with regard to the service-specific subscriber traffic becomes more and more important. The various available services have quite different characteristics with regard to their burst behaviour, the line- or packet-switched transmission mode, the data rate, the average transmission power and the symmetry/asymmetry between downlink and uplink. In addition, the partially quite different physical transmission characteristics of the various services have to be taken into account, as, as a rule, different transport channels are used therefor. These specific demands on third generation mobile communication networks are not met by the prior art and conventional methods and devices for the purpose of communication network optimisation.

From the view of the network operator, it appears important that all provided services are available with substantially equivalent subjective quality and equal covering. Therefore, it appears necessary to employ a network optimisation program, which provides the available services in the communication network all over the supply area with adequate quality.

It is the problem of the invention, to optimise the existing network configuration of a communication network quickly, cost-effectively and efficiently, taking into account the heterogeneous demands of different services for telecommunication, such that subsequently an equally good, usually, however, improved network configuration with regard to throughput and network quality is available, while maintaining the existing network coverage. In doing this, any change of cell location is not a proper optimising measure.

SUMMARY OF THE INVENTION

This problem is solved with the method mentioned in the beginning by the features of the characterising portion of claim 1. Furthermore, the problem is solved with a device of the type mentioned in the beginning by the characterising features of claim 9.

According to the invention, the problem is solved, in particular, in that by one-time or multiple, iterative variation of certain settings of the network configuration, in particular of the aerial orientation or of the transmission power of a reference signal, for example of a pilot channel, an improved network configuration is determined in cells selected by the method, for which configuration the cell area-referenced subscriber traffic in the considered network area is balanced as far as possible. With ideally balanced traffic distribution between the cells, the traffic can be optimally conducted with the predetermined cell locations. The method is supported by a graphic display of the cell areas, which are coloured with colours which correspond to the traffic of the respective cell. Thereby, problem areas with high traffic can easily be identified, and the network configuration can be specifically adjusted, at these locations, in accordance with the invention. Another possibility of graphic support of identification of problem regions with regard to other quantities in a mobile communication network is suggested in WO 00/28756.

On principle, the method of the invention may be employed for any cellular, wireless communication networks. In particular, the method is appropriate for third generation networks, which, for example, operate in accordance with the UMTS-standard and which offer to the mobile subscribers a plurality of different services of telecommunication. It is an advantage of the method that any number of provided services in the communication network having different demands, when optimising the network configuration, can be included.

A further advantage of the method is the high speed, as compared to other methods, with which results can be achieved. The reason is that the method is based exclusively on measured data or planning data, respectively, of the communication network or on a combination thereof, these data, as a rule, being available beforehand, as they are required in the planning procedure. No simulation of the communication network behaviour within the iterative optimising process is required, as this is the case, for example, in DE 196 19 208 A1. The method can also easily be automatised, which permits computerised realisation. The optional verification of network configurations matched by the method of the invention is independent of the optimising method proper, whereby the validation method can be freely selected and even exchanged. Besides of this, the validation because of this independence, gets much more significance and, on the other hand, is possible without expensive field measurements. The accuracy of the method can be enhanced as desired by taking into consideration additional data from the, under certain circumstances, simulative validation of the matched network configuration as well as further measuring data from the real communication network.

Advantageous modifications and alternatives of the method as well as of the device are subject matter of the sub-claims.

BRIEF DESCRIPTION OF THE DRAWINGS

The foregoing summary as well as the following detailed description of the invention will be best understood when considered in conjunction with the accompanying drawings, wherein.

DETAILED DESCRIPTION OF THE INVENTION

Figure 1:
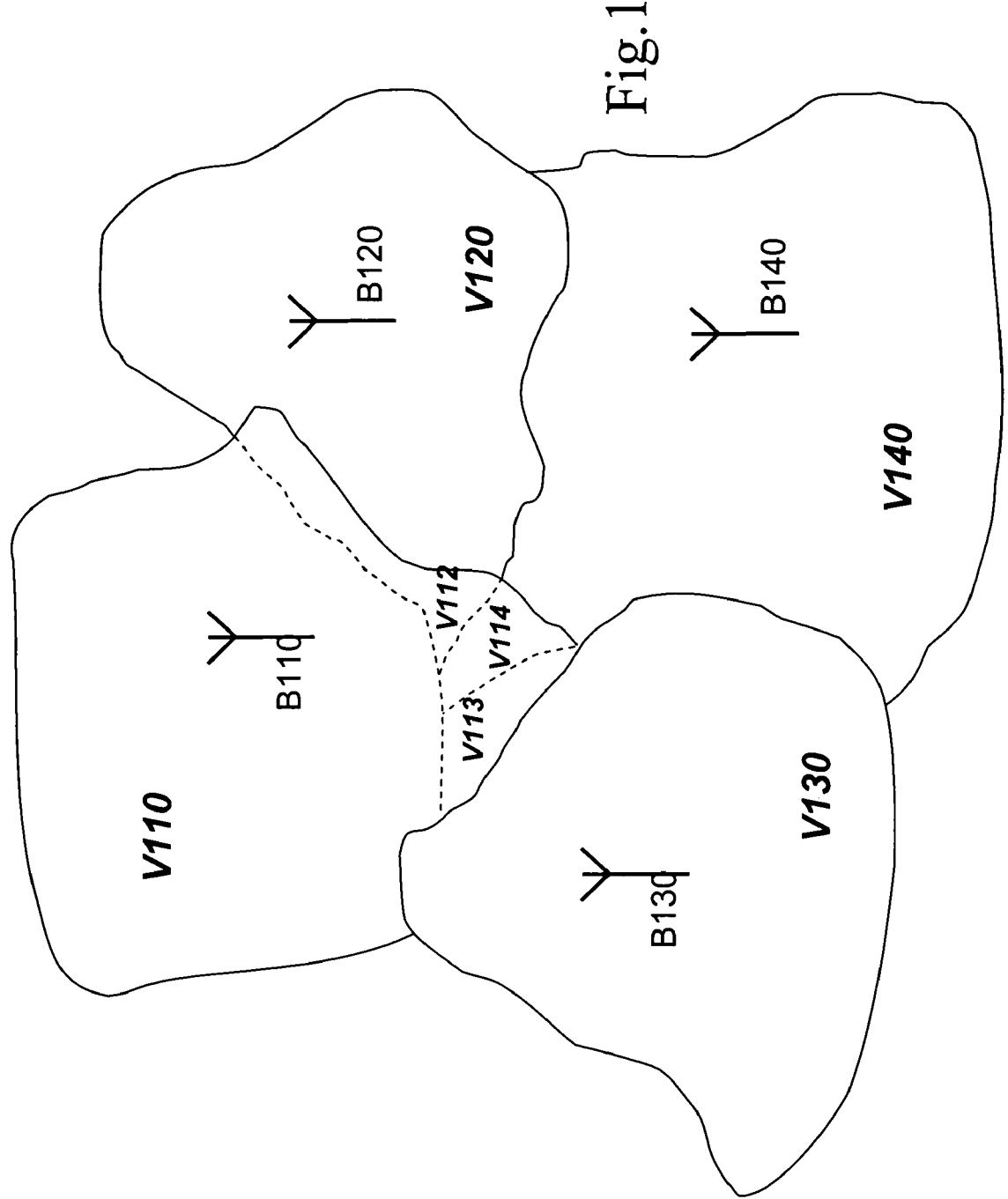
FIG. 1 shows an exemplary section of a mobile communication network.

The invention relates to a method of optimising the throughput of messages in cellular, wireless communication networks as well as to a device for carrying out the method. These are, in particular, cellular, wireless communication networks with mobile subscribers, which offer a service or a mixture of a plurality of services for telecommunication to one or a plurality of subscribers simultaneously, as this is the case, for example, in mobile telecommunication networks in accordance with the UMTS-standard. An exemplary configuration of such a communication network with four base stations B110, B120, B130 and B140 is illustrated in FIG. 1.

It is a decisive feature of the invention that no elaborate simulations, investigations or measurements are required for the carrying out of the method. Rather is the method based on data, which, as a rule, are available and are required anyhow in the network planning and optimising process. This ensures a quick carrying out of the method based on the requirements of network planning. The general course of the method is illustrated in the block diagram of FIG. 2.

Figure 2:
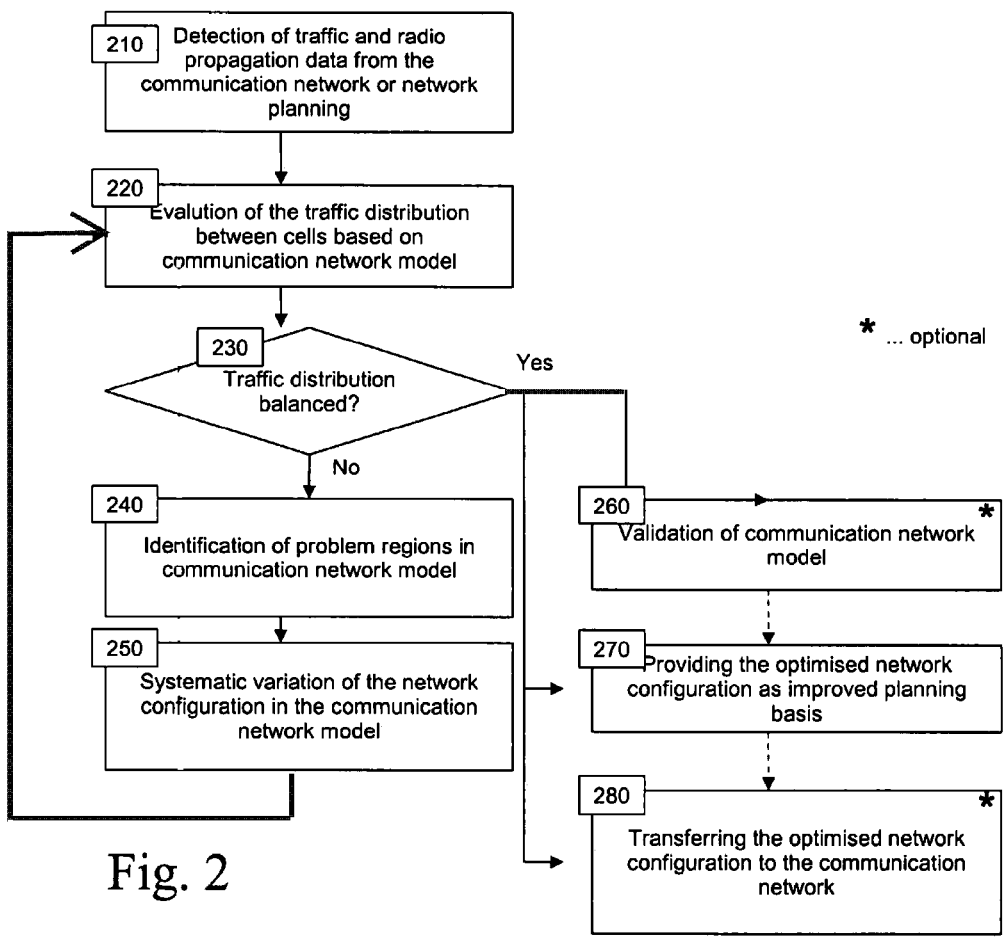
FIG. 2 is a schematic diagram illustrating operation of a method of optimizing cellular wireless communication networks.

In accordance with step 210 of FIG. 2, it is assumed that location-referenced data for the communication network or for the network section to be optimised, respectively, with respect to the subscriber traffic and the radio network coverage are available. In this respect, it is necessary that these data are provided with sufficient resolution per area, to ensure that for the covered region of any cell of the communication network, in each case a substantial number of values of the said quantities are available. An appropriate, though not compulsory, arrangement of these data has the form of a rectangular matrix consisting of many, relatively small rectangular area elements, each of which has associated therewith the respective value of the said quantities.

The subscriber traffic is the traffic per service provided in the communication network which traffic has been determined at different locations. The subscriber traffic data can be obtained both by measurements, numerical or analytical methods or simulations and by any combination thereof.

The network coverage required as input is derived from the cell-referenced reception power of a reference signal transmitted with constant transmission power by each cell, the reception power being detected at different locations. The reference signal may, for example, a pilot channel, as used in many mobile communication networks, among others for the radio identification of subscriber mobile stations. If no such reference signal exists in a communication network, a virtual reference signal may be assumed, which is transmitted by each cell of the communication network with the same transmission power. In the same way as with the subscriber traffic, the data of the reference signal reception power may be gained both by measurements, numerical or analytical methods, respectively, or simulations and by any combination thereof. Often, location-referenced path loss data of the electric field strength from each base station location exist, for example in matrix form, by means of which the location-referenced reference signal reception power can be computed, taking into account the transmission power of the reference signal, the aerials used and other radio propagation losses, as for example, a body damping.

At each location where reference signal reception power data are available, the cell having the best reception power is determined in a model of the communication network. In this way, association of area elements with cells is provided. All area elements which are associated with a certain cell are, at large, considered as cell area (in the following also merely "cell"). Because of the physical propagation conditions in the radio channel, which are valid for all services provided in the communication network, as well as due to the cell change algorithm for ensuring the subscriber mobility, which, as a rule, is based on the reception power of the reference signal as measured at the subscriber mobile station, the cell areas determined in the communication network model can be used as good approximation of the actual cells occurring in a communication network. In the exemplary section of a mobile communication network of FIG. 1, the cells being formed around the base stations in the manner just described are plotted in solid lines.

The aim of the method is the improvement of the throughput of messages of in the communication network by an optimised distribution of the provided subscriber traffic between the cells. It has been found that the subscriber traffic of all services can then be conducted with best quality, if a traffic distribution as balanced as possible prevails. Insofar, this method aims at establishing this balance of the traffic between the cells. Thus, in order to achieve this object, certain cell areas have to be shifted relative to each other to permit interchanging of the subscriber traffic, which, apart from this, is invariable and stationary, between the cells. Generally, the subscriber traffic per cell area is determined by accumulating the present traffic values within the respective cells in the model of the communication network. As, with a plurality of services, the traffic per service at a certain location can be quite different, the traffic values of different services have to be summed up appropriately weighted. The weighting depends on the radio interference effectively generated by the respective service and the utilisation of the resources. Therefore, depending on the communication network, parameter as, for example, the system band width, the channel band width, the ratio to be achieved of signal power and interference power, the spreading factor, the average or maximum data rate, the activity factor, the code limitation enter the traffic weighting. In FIG. 1, the traffic values per line summed up in this way are designated by V 110, V 120 and V 140.

After the cell-related values of the subscriber traffic are available, at first in accordance with step 220 in FIG. 2, the reached approximation on the desired substantial balance of the subscriber traffic between the cells has to be evaluated. To this end, as one possible variant of the invention, a graphic display of the investigated mobile communication network can be used as assistance, similar to FIG. 1, the individual cell areas being filled with colour associated with the subscriber traffic carried out therein. If, after investigation in step 230 of FIG. 2, an adequate balance of the subscriber traffic between the cells has already been reached, the method can be terminated, and the network configuration thus found can, in the simplest case as shown in FIG. 2, be made available to the network planning as improved basis for planning in accordance with step 270. If this state has not yet been reached, this display serves, in step 240 of the method, to quickly locate problem zones, in which adjacent cells carry out quite different traffic. In another variant of the invention, the identification of the problem regions can also be effected in automated way by a numerical method, in which the differences of the subscriber traffic values between adjacent cells are investigated. This automated step is then incorporated in the total optimising method consisting of the steps 220 to 250 of FIG. 2 for minimising the differences of the subscriber traffic values between the cells.

A local displacement of cell areas following after step 250 in FIG. 2 can be achieved by the variation of certain network configuration parameters at individual network elements in the model of the communication network, in particular by appropriate matching of the aerial inclination angle or of the aerial height of the respective applied aerial diagram or, for example, matching the transmission power of the reference signal at selected cells. Because, as described above, all these parameters enter the determination of the reference signal reception power, which is of decisive importance for the form of the cell areas, cell surfaces can be changed also in this way. If, for example, in the network configuration of FIG. 1 a locally limited high subscriber traffic V 110 was detected in the cell of base station B 110, an appropriate adjustment of the network parameters should be made, according to the invention, which causes reduction of the cell area and, thereby, causing transfer of part of the traffic from this cell into adjacent cells. After the network configuration has been adjusted, the displacement of the cell areas shown by dashed lines has been reached. Thereby, the stationary partial traffic values V 112, V 113 and V 114 have been subtracted from the traffic V 110 of the cell at base station B 110. These values were distributed to the cells of the base stations B 120, B 130 and B 140, as shown in the Figure, these cells now having the traffic values V 120+V 112, V 130+V 113 and V 140+V 114, respectively. Then the network configuration thus achieved is better, if thanks to the changes made the subscriber traffic values of the individual cells are more balanced than before.

Preferably, the variation of the cell areas to achieve substantial balance of the subscriber traffic between the cells is made iteratively, so that the original network configuration can be approximated step-by-step to an optimised network configuration. In one iteration step, only one or few parameters of the network configuration are changed. Thereafter, the approximation to the desired balance of the subscriber traffic between the cells is checked anew in accordance with the steps 220/230 of FIG. 2, the new cell areas as defined by the varied network configuration forming the basis therefor. From the result of the test, the necessary variation of the network configuration in the next iteration step is derived. This procedure may also be automated by means of numerical methods. The stepwise approach can be terminated, when a sufficient balance of the subscriber traffic between the cells has been reached. In particular, it is a criterion that the traffic in the cells with the originally highest subscribers traffic has been clearly reduced as compared to the average subscriber traffic in the communication network model. Such a reduction of the traffic reduces the local interference level, whereby also the network quality may be improved.

If a network configuration has been reached which exhibits a considerably more balanced distribution of the subscriber traffic between cells than the original configuration, the result of the network matching of step 260 of FIG. 2, according to an advantageous variant of the invention, may be validated. The validation may, for example, be effected by means of a network simulation. In doing this, preferably it should be aimed at taking into account, with this simulation, the time response of the network, in order to be able to assess the network quality, though this is not absolutely necessary. As a measure of network quality, for example, the number and locations of blocked switching attempts or broken connections, respectively, the developed error rate and delay of connections, or the throughput per connection or per cell may be used. Of course, also after the network matching, an adequate network coverage has to be ensured, i.e. the various services have to be available at the predetermined locations.

Results of the communication network may, subsequently, as a further advantageous variant of the invention, be used to employ them in a repeated optimisation of the communication network, in order to increase the accuracy of the method. Such quantities may, in particular, be the subscriber traffic actually occurring in the network simulation, but also quantities representing the radio interference. The latter include, among others, the so-called "noise rise", which characterises the proportion of the radio interference relating locally to one cell and caused by other subscribers as referenced to the total interference level of the cell in the uplink. This quantity provides, in particular for CDMA-networks, interesting indications with regard to the local network utilisation. Also information with regard to the local occurrence of call rejections, interruption of connection or failed cell change attempts can be used as boundary conditions for subsequent optimisation of the communication network. Furthermore, also quantities such as, for example, the ratio of transmission power of the reference signal to the total interference power per cell can be used for this refinement of the method of the invention.

In similar way, in a further variant of the invention, such network simulations discussed above can be applied already beforehand to the original network configuration, in order to permit comparison with the optimised network configuration with regard to network quality. Thereby, also the mentioned additional quantities from the network simulation may enter the method of the invention. Besides simulatively determined traffic values as direct input quantity, in particular further boundary conditions for the method may be fixed. This applies, for example, to the various reasons and the local limitations of interruption and rejection of connections, the analysis of which provides interesting information for a fine control of the method of the invention. As a variant hereto, also measured values of other quantities from the real communication network, in particular of the quantities mentioned before, can enter the initial validation of the original network configuration.

Figure 3:
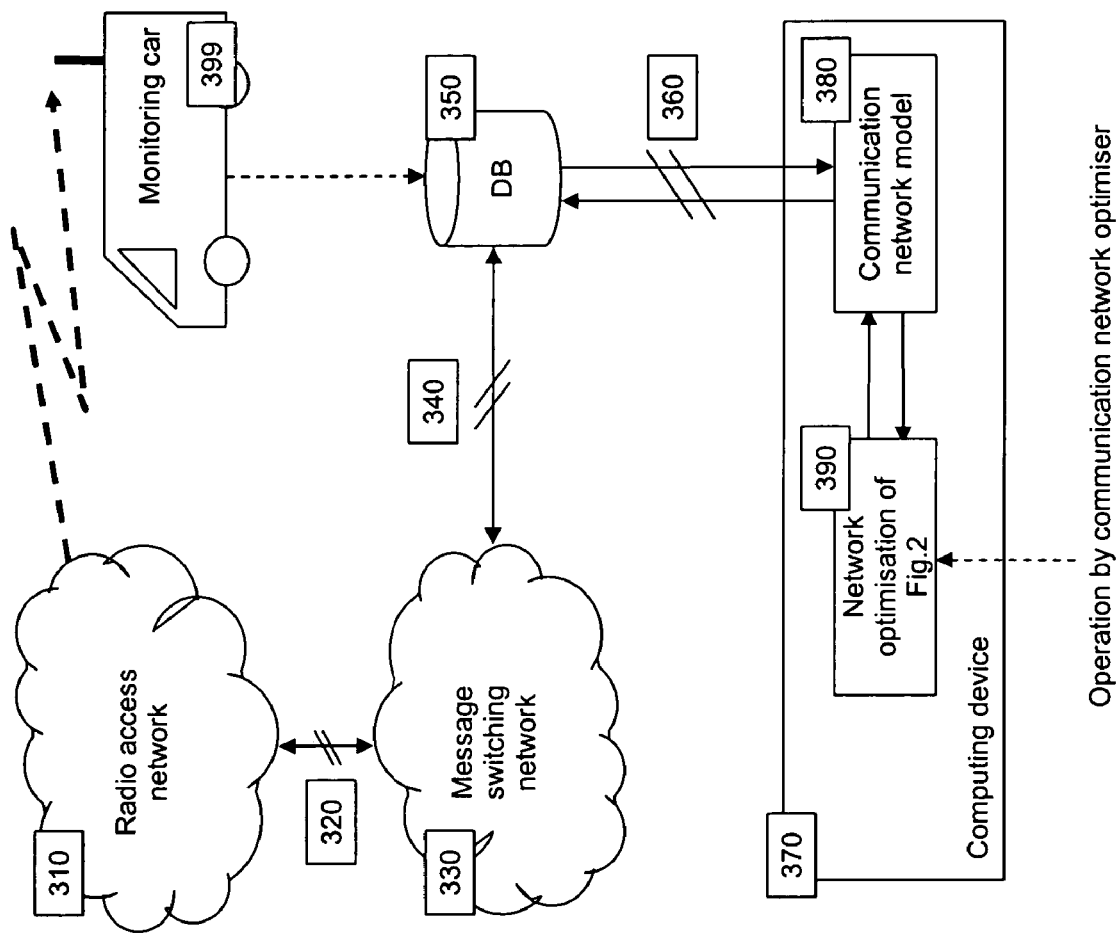
FIG. 3 is a schematic diagram showing a device for optimizing cellular wireless communication networks of the invention.

In order to take advantage of the improved network configuration determined by the method of the invention, the method is incorporated in the device of the invention shown in FIG. 3. For a more detailed explanation, there is discrimination between the radio access network 310 and the message switching network. 330, which can communicate with each other through a bi-directional interface. The radio access network is that part of the communication network which establishes the direct radio connection to the mobile subscribers, i.e. it comprises substantially the base stations of the communication network and, if required, further components, inasmuch as those are necessary for the direct communication with the subscribers. The message switching network establishes the networking of the base stations in the communication network together with switching stations and gateways to other networks or service providers. Through the interface 320, both the transmitted subscribers' messages and manifold signalling and control information can be transmitted in both directions. A database 350 is provided for the message network, in which position data, configuration data of the individual network elements, measuring data of various quantities from the message network, counter data from the network elements, call statistics, planning data etc are combined. In this connection, the database symbol in FIG. 3 at first represents merely a logic aggregation of all these data. Depending on the implementation with a network provider, this data collection may also be realised by a plurality of databases coupled as required. Data from the message network can, at any time, be stored in the database through the bi-directional interface 340, also new network configuration can be transmitted therethrough to the message network. In addition, optionally, quantities and parameters from the message network measured by means of a mobile measuring device, not necessarily motorised as shown in the Figure, can be stored in the database.

For carrying out the method of the invention in the device, there is a computer device 370, which contains a numerical implementation of the communication network in the form of a communication network model 380. This model reflects the initial network configuration, which has been loaded into the database through the bi-directional interface. Now the method 390 of the invention, as shown in FIG. 2, works in the computer device on the basis of the communication network in order to establish an improved network configuration. In doing so, the changes of the network configuration are made in the numerically implemented communication network model 380, whereby subsequently the improved configuration is set directly there. If required, optimisation of the message network may be controlled and monitored by a communication network optimiser. This exertion of influence may, however, be substantially limited by the automation described above.

Now, the thus determined improved network configuration can be transferred through the interface 360 at first to the database and from there into the message network.

Measuring values from the message network 310,330 itself or through a measuring device 399 permit completing evaluation of the achieved improvement of the throughput and the network quality. Such measured quantities may, in turn, also be submitted to the computer device, in order to contribute there to the validation of the improved network configuration.

As, in a message network, in particular with a plurality of provided services, the local subscriber traffic per service can change quite heavily also short-time, i.e. several times during a day, it is appropriate to adapt the network configuration promptly to the changed conditions with regard to traffic. This can be achieved with one variant of the device of the invention, wherein the high speed of the underlying method is advantageous. In this variant, the current state of the network configuration and of the traffic, which are stored in the database, are transferred to the computer device 370 and are there, at once, processed with the method of the invention. Subsequently, the promptly determined network configuration better matched to the instantaneous network conditions is re-transferred to the database, from where it is transferred directly into the message network and becomes active there. This permits comparatively quick reaction to a varying subscriber traffic in the message network.

Though the present invention together with its advantages have been explained in detail, it should be made clear, that various further modifications and variations of the invention within the meaning of the above descriptions can be realised, without departing from the spirit and scope of the invention as covered by the claims.

The example of an embodiment described below serves to illustrate the method of the invention of optimising message networks by means of a selected section of a UMTS/FDD communication network, the general features of which are, for example, described in H. Holma and A. Toskala (ed.), "WCDMA for UMTS", $2^{nd}$ Ed. John Wiley & Sons, Chichester UK, ISBN 0-470-84467-1. The starting point represents a region covering about 10 $km^2$, in which a total of 15 transmitter stations with 3 cells each are arranged and configured in accordance with the planning methods to-day conventional and corresponding to the state of the art. For each transmitter station, the path loss of receiver locations arranged in a matrix (path loss matrix) is computed with a special resolution of 10 m in accordance with the present state of the art by means of radiation-optical propagation models, making use of a detailed 3D-surrounding area model. Furthermore, information with regard to the location-related traffic density in the form of traffic matrices with a spatial resolution of 25 m are forms the basis of a speech service (Speech) and a WWW-service (WWW).

In the embodiment, the initial network configuration is analysed by means of a dynamic UMTS-system simulator with regard to capacity and quality of the telecommunication. Subsequently the communication network is optimised by means of the method of the invention and the changed network configuration is again subjected to a dynamic analysis with regard to effected changes in capacity and quality.

For each cell, the resulting equivalent traffic is computed on the basis of the underlying traffic models and the available location-related traffic density information. The local supply area of each cell as resulting from the wave propagation conditions and the network configuration can be made in colours, the colour code corresponding to the equivalent traffic computed before. In this connection, not the absolute value is decisive but the relative deviation of the values of adjacent cells.

For cells adjacent in space a quite different traffic to be conducted is to be expected. After the analysis of the network configuration by means of a dynamic system simulator with regard to capacity and quality, according to the invention, a communication network is determined by iterative variation of the aerial orientation and the transmitter power of the reference signals, alone based on the given location-related traffic and radio propagation data, this configuration providing, as compared to the initial configuration, a considerably better balanced traffic to be expected.

It can be shown that network configurations determined by the optimising method of the invention provide a better balanced distribution of the traffic to the cells. Thereby, it should be possible to better utilise the available global communication network capacity.

It is apparent, that by means of the optimising method of the invention the original blocking and connection interruption probability can be reduced in the example. Nearly all service demands can be admitted and served with the optimised network configuration. In the example, an increase of 11 percent of the connection simultaneously served by the communication network under the general conditions described can be demonstrated.

We claim:

1. A method of optimizing real cellular, wireless communication networks providing telecommunication services simultaneously to a plurality of subscribers and having a network configuration comprising a plurality of radio cells, each said radio cell covering a coverage region, said wireless communication network being sub-divided into area elements, said network configuration being defined by network configuration parameters, said method comprising the steps of:

transmitting, in each said cell a reference signal of constant transmission power;

providing for each said area element a cell-referenced value of the power received from one or more of said reference signals, respectively;

providing a model of said communication network having an original model network configuration;

assigning each of said area elements to the cell with the best reception power, said assignments defining cell areas in said model of the communication network;

iteratively optimizing said model network configuration by determining a subscriber traffic per cell by accumulating and measuring service-specific network subscriber traffic values of said area elements assigned to a cell for all cells respectively and locally displacing said cell areas by variation of network configuration parameters to achieve a maximum balance of the traffic distribution between the cells, so as to provide an optimized model network configuration;

wherein in said step of iteratively optimizing said model network configuration, results of each said iteration are physically implemented into the network and measured;

wherein said iterative optimization further comprises determining that said step of iteratively optimizing said model network configuration has resulted in an optimized network configuration, wherein said determination step is based on a comparison of whether the difference of the subscriber traffic per cell of each cell and the average of the subscriber traffic for all cells exceeds an optimization threshold; and validating said optimized network configuration by subsequent network simulation of the optimized network configuration to determine if the optimized network configuration meets specified quality and coverage requirements, so that if said validating by subsequent network simulation determines that the optimized network configuration fails to meet specified quality and coverage requirements, the network configuration is adjusted to meet the specified quality and coverage requirements and implementing said validated or adjusted network configuration in said real communication network;

wherein said step of determining a subscriber traffic per cell by accumulating and measuring said service-specific network subscriber traffic values further comprises continuously monitoring said service-specific network subscriber traffic values and continuously feeding said service-specific network subscriber traffic values back into the iterative optimization step;

wherein, said step of validating said optimized network configuration by subsequent network simulation uses a statistical network simulation method to model the time-related behavior of said communication network by taking into account multiple instantaneous states of the communication network.

2. A method as claimed in claim 1, wherein said service-specific network subscriber traffic values and received power values associated with said area elements are arranged in matrices.

3. A method as claimed in claim 1, wherein path losses during signal transmission are included in said communication network model.

4. A method as claimed in claim 1, wherein, radio interference is generated by each provided service, said communication network having resources being utilized by subscribers and defining a utilization ratio per subscriber, and, for each service, parameters obtained in said step of measuring said service-specific network subscriber traffic values are made dependent on said radio interference generated by said service and the utilization ratio of the resources per subscriber, and on other parameters of said service.

5. A method as claimed in claim 1, wherein, radio interference is generated by each provided service, said communication network having resources being utilised by subscribers and defining a utilisation ratio per subscriber, and for each provided service determining weights wherein said weights are made dependent on said radio interference generated by said service and the utilization ratio of the resources per subscriber, and on other parameters of said service, said other parameters comprising at least one parameter of the group system band width, channel width, ratio of signal power to interference power, activity factor and code limitation each of said service-specific network subscriber traffic values is weighted/evaluated according to its respective weight.

6. A method as claimed in claim 1, wherein said optimized model network configuration provides for maximal balance, between the individual cells, of the distribution of the subscribers traffic per cell.

7. A method as claimed in claim 1, wherein said subsequent simulation of an adequate radio communications network system model further comprises simulation of an adequate radio communication network model, using a dynamic network simulation, whereby said dynamic network simulation adequately models the time-related behaviour of said communication network in order to determine meaningful characteristics for the evaluation of the network qualities, wherein a large number of instantaneous states of the communication network are modelled to determine statistic characteristics for the evaluation of network qualities.

8. A method as claimed in claim 1, wherein said communication network covers an area which includes individual cell regions, and further comprising the steps of:

providing a map of said area covered by said communication network, determining the distribution of subscriber traffic on said individual cell regions, and graphically displaying said distribution of subscriber traffic on said map in colours unambiguously associated with said subscriber traffic values.

9. A method as claimed in claim 1, wherein said communication network covers an area which includes individual cell regions, said method comprising of the following further steps:

provides a map of said area covered by said communication network, determining the distribution of subscriber traffic on said individual cell regions, graphically displaying said distribution of subscriber traffic on said map in colours unambiguously associated with said subscriber traffic values, identifying those cells which clearly deviate from the average subscriber traffic provided per cell, and varying, in iterative steps of said iterative optimization, parameters of said communication network configuration to achieve, with said deviating cells, uniform distribution, between the cells, of the subscriber traffic.

10. A method as claimed in claim 1, and further comprising the steps of:

defining, in each iteration step of said iterative optimization, a matrix of matrix fields from analysis of the geographic neighborhood relations of said cells, each of said cells being associated with a column and a rows of said matrix, inscribing into said matrix fields the differences of said subscriber traffic values, and providing an automated process for determining from said matrix at least one cell for which subsequently certain of said network configuration parameters are varied to improve the network configuration of said communication network.

11. A method as claimed in claim 1, wherein said step of validating said optimized network configuration by subsequent network simulation further comprises the step of entering into said subsequent network simulation, as additional input, the cell-related throughput.

12. A method as claimed in claim 1, wherein said step of validating said optimized network configuration by subsequent network simulation further compromises the steps of:

validating said optimized network configuration by entering into said subsequent network simulation, as additional input the cell-related throughput, and further entering, as additional boundary conditions, quantities selected from the group of: reasons and locations of locally occurring denials of connection desires, and connection interruptions, and validating said optimized network configuration by providing measured values of quantities from the real communication network, and utilizing these measured values as additional inputs in the validation of the traffic distribution between the cells of the communication network.

13. A method as claimed in claim 1, wherein a mobile at a predetermined location is exposed to the coverage region of more than one cell or base station, so that the mobile is connected to the cell with the best reception power of the referenced signal.

* * * * *